United States Patent
Gonzalez Parra et al.

(10) Patent No.: US 11,479,370 B2
(45) Date of Patent: Oct. 25, 2022

(54) AIRCRAFT TURNAROUND MONITORING SYSTEMS AND METHODS

(71) Applicant: THE BOEING COMPANY, Chicago, IL (US)

(72) Inventors: Garoe Gonzalez Parra, Neu-Isenburg (DE); Millie Irene Sterling, Neu-Isenburg (DE); Darren Macer, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 602 days.

(21) Appl. No.: 16/423,249

(22) Filed: May 28, 2019

(65) Prior Publication Data

US 2020/0377232 A1  Dec. 3, 2020

(51) Int. Cl.
| | | |
|---|---|---|
| *B64F 5/40* | (2017.01) | |
| *B64D 45/00* | (2006.01) | |
| *B64F 1/36* | (2017.01) | |

(52) U.S. Cl.
CPC ............ *B64F 5/40* (2017.01); *B64D 45/00* (2013.01); *B64F 1/36* (2013.01)

(58) Field of Classification Search
CPC ...... B64F 5/40; B64F 1/36; B64F 5/30; B64F 5/60; B64D 45/00; B64D 47/08; B64D 43/00; G08G 5/0013; G08G 5/0026; G08G 5/0043; G08G 5/0082; G06Q 10/0639; H04N 7/18

See application file for complete search history.

(56) References Cited

U.S. PATENT DOCUMENTS

| | | | | |
|---|---|---|---|---|
| 6,405,975 B1 * | 6/2002 | Sankrithi | ............... | B64D 47/08 244/50 |
| 7,437,225 B1 * | 10/2008 | Rathinam | ............ | G08G 5/0013 340/961 |
| 10,019,905 B1 * | 7/2018 | Kneuper | ................ | G08G 5/025 |
| 10,089,891 B2 * | 10/2018 | Agrawal | ............. | G08G 5/0095 |
| 10,620,629 B2 * | 4/2020 | Laughlin | .............. | G05D 1/0083 |
| 2010/0063716 A1 * | 3/2010 | Brozat | ................. | G08G 5/0043 701/120 |
| 2011/0068954 A1 * | 3/2011 | McQuade | ................ | G08G 1/20 340/988 |

(Continued)

FOREIGN PATENT DOCUMENTS

| | | | | |
|---|---|---|---|---|
| CN | 105139098 A | * | 12/2015 | ........... G08G 5/0013 |
| CN | 105912975 A | * | 8/2016 | ......... G06K 9/00771 |

(Continued)

OTHER PUBLICATIONS

"Assaia Apron AI," https://assaia.com/ (Year: 2019).*

(Continued)

*Primary Examiner* — Behrang Badii
*Assistant Examiner* — Jalal C Coduroglu
(74) *Attorney, Agent, or Firm* — The Small Patent Law Group LLC; Joseph M. Butscher (57) ABSTRACT

A turnaround monitoring system and method are configured to monitor a turnaround of an aircraft at an airport. The turnaround monitoring system and method include receiving, by a turnaround analysis control unit, turnaround data regarding the aircraft at the airport, and determining, by the turnaround analysis control unit, a turnaround status of the aircraft based on the turnaround data.

21 Claims, 5 Drawing Sheets

(56) References Cited

U.S. PATENT DOCUMENTS

| | | | | |
|---|---|---|---|---|
| 2015/0100571 A1* | 4/2015 | Floyd | ................ | G06F 16/9537 |
| | | | | 707/724 |
| 2015/0348422 A1* | 12/2015 | Agrawal | ................ | G06Q 10/06 |
| | | | | 701/120 |
| 2016/0055260 A1* | 2/2016 | Floyd | ................ | G06F 16/9024 |
| | | | | 707/798 |
| 2016/0055665 A1* | 2/2016 | Floyd | ...................... | G09G 5/02 |
| | | | | 345/419 |
| 2016/0205724 A1* | 7/2016 | Shi | ...................... | H04W 92/02 |
| | | | | 370/254 |
| 2016/0247101 A1* | 8/2016 | Agrawal | ................ | B64D 47/08 |
| 2017/0011638 A1* | 1/2017 | Agrawal | ......... | G06Q 10/06312 |
| 2017/0315014 A1* | 11/2017 | Regan | ................ | G01M 1/122 |
| 2018/0018882 A1* | 1/2018 | Joyson | ................ | G08G 5/0026 |
| 2018/0137765 A1* | 5/2018 | Sindlinger | ........... | G08G 5/0052 |
| 2018/0229856 A1* | 8/2018 | Agrawal | ................ | B64F 5/60 |
| 2018/0286257 A1* | 10/2018 | Schwartz | ............. | G08G 5/0034 |
| 2018/0373246 A1* | 12/2018 | Laughlin | ................ | G06Q 10/08 |
| 2019/0005441 A1* | 1/2019 | Savian | ................ | G06Q 10/087 |
| 2019/0066520 A1* | 2/2019 | Schwartz | ............. | G08G 5/0021 |
| 2019/0137997 A1* | 5/2019 | Sterling | ............... | G08G 5/0043 |

FOREIGN PATENT DOCUMENTS

| | | | | |
|---|---|---|---|---|
| CN | 106339292 A | * | 1/2017 | ....... G06Q 10/06315 |
| EP | 2950250 | | 12/2015 | |
| EP | 2950250 A1 | * | 12/2015 | ........... G08G 5/0013 |
| EP | 3059722 A1 | * | 8/2016 | ............. G06Q 50/30 |
| EP | 3270336 | | 1/2018 | |
| EP | 3270336 A1 | * | 1/2018 | ........... G08G 5/0013 |
| WO | WO 2012/110046 | | 8/2012 | |
| WO | WO-2012110046 A1 | * | 8/2012 | ........... G08G 5/0026 |

OTHER PUBLICATIONS

"Assaia Apron AI," https://assaia.com/.
Extended European Search Report for EP 20127279.1, dated Oct. 22, 2020.

* cited by examiner

AIRCRAFT TURNAROUND MONITORING SYSTEMS AND METHODS

FIELD OF THE DISCLOSURE

Embodiments of the present disclosure generally relate to aircraft turnaround monitoring systems and methods.

BACKGROUND OF THE DISCLOSURE

Various types of aircraft are used to transport passengers and cargo between numerous locations. Each aircraft typically flies between different locations according to a defined flight plan or path. For example, an aircraft departs from a departure airport and flies to an arrival airport.

An aircraft may fly multiple flights between different airports. For example, an aircraft may depart from a first airport and arrive at a second airport. At the second airport, the aircraft may prepare for another flight to a third airport or back to the first airport. Turnaround between scheduled flights for an aircraft is a time from when the aircraft lands at an airport until the aircraft departs from the airport.

During a turnaround, various tasks are performed in order to ensure that the aircraft is readied for its next flight. For example, a first set of passengers arriving at a destination airport aboard the aircraft disembark from the aircraft. As and/or after the passengers leave the aircraft, an internal cabin of the aircraft is cleaned, such as by a cleaning staff. Further, luggage of the arriving passengers is removed from a luggage area of the aircraft. The aircraft is refueled for the next flight. A catering service removes used utensils and the like, and also resupplies the aircraft with food and drink items for the next flight. A flight crew for the arriving flight may depart the aircraft. A new flight crew for the next flight may board the aircraft. Additionally, a second set of passengers that is to depart from the airport aboard the aircraft boards the aircraft.

Typically, aircraft operators are not aware of all the details of progress of a turnaround process. In particular, while an aircraft operator is aware when an aircraft arrives at a gate, and when the aircraft leaves the gate, in order to determine a status of a particular turnaround services, the operator makes a series of phone calls between a ground operations center, airline dispatch, pilots, ramp agents, service companies, airport control offices, and/or the like As can be appreciated, the process of gaining situational awareness of a turnaround process may be tedious and time-consuming.

SUMMARY OF THE DISCLOSURE

A need exists for a system and a method for efficiently determining situational awareness of an aircraft turnaround process. Further, a need exists for a system and a method for automatically analyzing a turnaround process. Moreover, a need exists for a system and a method for gaining situational awareness of a turnaround process without requiring an individual to make a series of calls to other individuals within an airport and/or on an aircraft.

With those needs in mind, certain embodiments of the present disclosure provide a turnaround monitoring system that is configured to monitor a turnaround of an aircraft at an airport. The turnaround monitoring system includes a turnaround analysis control unit that receives turnaround data regarding the aircraft at the airport and determines a turnaround status of the aircraft based on the turnaround data.

In at least one embodiment, the turnaround monitoring system includes one or more cameras and one or more sensors. The camera(s) and the sensor(s) output the turnaround data regarding the aircraft. The turnaround analysis control unit is in communication with the camera(s) and the sensor(s). The turnaround analysis control unit receives the turnaround data from the camera(s) and the sensor(s).

The camera(s) may include at least one camera on or within the aircraft. The camera(s) may include at least one camera at the airport. In at least one embodiment, the camera(s) include one or more cabin cameras that are configured to capture and output images within the internal cabin, one or more tail cameras mounted on a tail of the aircraft that are configured to capture and output images outside of the aircraft, one or more stabilizer cameras mounted on one or more stabilizers of the aircraft that are configured to capture and output images outside of the aircraft, one or more belly cameras mounted on a belly or underside of a fuselage of the aircraft that are configured to capture and output images outside of the aircraft, and/or one or more wing cameras mounted on one more wings of the aircraft that are configured to capture and output images outside of the aircraft.

The sensor(s) may include one or more fuel sensors that are configured to detect an amount of fuel within one or more fuel tanks of the aircraft. The sensor(s) may include one or more door sensors that are configured to detect a position of one or more doors of the aircraft.

In at least one embodiment, the turnaround data includes information including passenger information, luggage, catering, fueling, cleaning, and crew. In at least one embodiment, the turnaround status includes information regarding passengers disembarking and boarding the aircraft, luggage removed from and boarded onto the aircraft, catering, fueling of the aircraft, cleaning of an internal cabin of the aircraft, and crew status.

In at least one embodiment, the turnaround monitoring system also includes a turnaround database that stores historical turnaround data, and a turnaround prediction control unit that predicts a time of completion of the turnaround based on a comparison of the turnaround data and the historical turnaround data.

The turnaround monitoring system may also include a gate computer at a gate of the airport. The turnaround analysis control unit is in communication with the gate computer. The gate computer outputs the turnaround data to the turnaround analysis control unit.

The turnaround monitoring system may also include a flight computer of the aircraft. The turnaround analysis control unit is in communication with the flight computer. The flight computer outputs the turnaround data to the turnaround analysis control unit.

In at least one embodiment, the turnaround monitoring system also includes a display in communication with the turnaround analysis control unit (and optionally the turnaround prediction control unit). The turnaround analysis control unit shows the turnaround status on the display.

In at least one embodiment, the turnaround analysis control unit includes a passenger analysis module, a luggage analysis module, a catering analysis module, a fueling analysis module, a cleaning analysis module, and a crew analysis module.

Certain embodiments of the present disclosure provide a turnaround monitoring method that is configured to monitor a turnaround of an aircraft at an airport. The turnaround monitoring method includes receiving, by a turnaround analysis control unit, turnaround data regarding the aircraft at the airport, and determining, by the turnaround analysis control unit, a turnaround status of the aircraft based on the turnaround data.

In at least one embodiment, the turnaround monitoring method also includes communicatively coupling one or more cameras with the turnaround analysis control unit, communicatively coupling one or more sensors with the turnaround analysis control unit, and outputting the turnaround data by the camera(s) and the sensor(s). The receiving includes receiving the turnaround data that is output by the camera(s) and the sensor(s).

In at least one embodiment, the turnaround monitoring method also includes storing historical turnaround data in a turnaround database, and predicting, by a turnaround prediction control unit, a time of completion of the turnaround based on a comparison of the turnaround data and the historical turnaround data.

The turnaround monitoring method may also include communicatively coupling a gate computer with the turnaround analysis control unit, and outputting the turnaround data from the gate computer. The receiving includes receiving the turnaround data output by the gate computer.

The turnaround monitoring method may also include communicatively coupling a flight computer of the aircraft with the turnaround analysis control unit, and outputting the turnaround data from the flight computer. The receiving includes receiving the turnaround data output by the flight computer.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide aircraft turnaround monitoring systems and methods that are configured to automatically monitor and report an aircraft turnaround process. In at least one embodiment, one or more images (such as a video feed) from aircraft-mounted cameras and status information from different aircraft and ground equipment sensors are received at a turnaround analysis control unit. The images are processed, applying image recognition techniques to detect and track elements related to the turnaround process (for example, fuel, catering or bag trucks, gate bridge position, power, pneumatic or air conditioner auxiliary connections, individual bags or catering trolleys, passenger disembarking and boarding, and/or the like). Such information may be aggregated with aircraft and ground equipment sensor information, (for example, parking brake status, doors open/close position, fuel levels, and/or the like). The aircraft turnaround monitoring systems and methods are configured to analyze such information and report and predict turnaround milestones to pilots, the airline control center, airports, air traffic control, and/or any other interested subscribers.

As described herein, embodiments of the present disclosure provide a turnaround monitoring system that includes a turnaround analysis control unit that receives turnaround data from one or more cameras and one or more sensors and determines a turnaround status of an aircraft based on the turnaround data. In at least one embodiment, the turnaround monitoring system also includes a turnaround prediction control unit that predicts a time of completion of the turnaround based on a comparison of the turnaround data and historical turnaround data. The turnaround data includes information regarding various turnaround aspects, such as passenger information (for example, passengers disembarking from a first flight and passengers boarding a subsequent second flight), luggage, catering, fueling, cleaning, crew, and the like.

Figure 1:
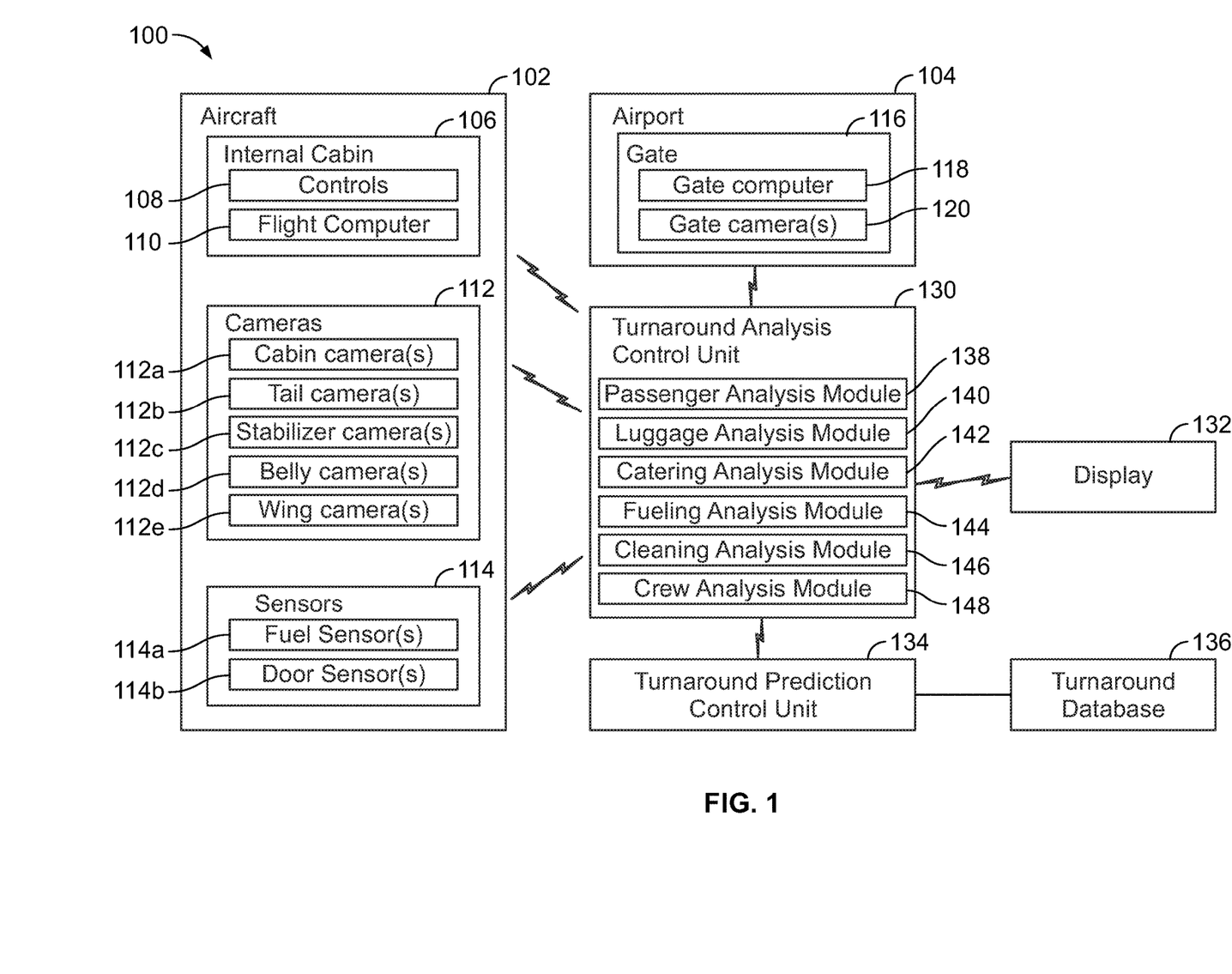
FIG. 1 is a schematic block diagram of an aircraft turnaround monitoring system, according to an embodiment of the present disclosure.

FIG. 1 is a schematic block diagram of an aircraft turnaround monitoring system 100, according to an embodiment of the present disclosure. The aircraft turnaround monitoring system 100 is configured to monitor a turnaround of an aircraft 102 that lands at and departs from an airport 104. A turnaround for the aircraft relates to a time that the aircraft 102 on a first flight lands at the airport 104 and a time that the aircraft 102 subsequently departs from the airport 104 on a second flight.

The aircraft 102 includes an internal cabin 106. The internal cabin 106 includes a cockpit in which controls 108 and a flight computer 110 are located. The controls 108 and the flight computer 110 are used to control the aircraft 102 during a flight and on the ground. The flight computer 110 may also be used to input and output data, such as when passengers have disembarked, doors are opened and closed, and/or the like.

The aircraft 102 also includes a plurality of cameras 112 that are configured to capture and output images (such as still images and video feeds). The cameras 112 include one or more cabin cameras 112a that are configured to capture and output images within the internal cabin, one or more tail cameras 112b mounted on a tail of the aircraft 102 that are configured to capture and output images outside of the aircraft 102, one or more stabilizer cameras 112*c* mounted on one or more stabilizers of the aircraft 102 that are configured to capture and output images outside of the aircraft 102, one or more belly cameras 112*d* mounted on a belly or underside of a fuselage of the aircraft 102 that are configured to capture and output images outside of the aircraft 102, one or more wing cameras 112*e* mounted on one more wings of the aircraft 102 that are configured to capture and output images outside of the aircraft 102, and/or the like. In at least one embodiment, the aircraft 102 includes more or less cameras 112 than shown. For example, the aircraft 102 may not include stabilizer cameras. As another example, the aircraft 102 may include cameras within a baggage and/or cargo area within the aircraft 102.

The aircraft 102 also includes a plurality of sensors 114 that are configured to sense different aspects. The sensors 114 includes one or more fuel sensor(s) 114*a* that are configured to detect an amount of fuel within one or more fuel tanks of the aircraft 102, one or more door sensors 114*b* that are configured to detect a position of one or more doors (such as between an open position and a closed position) of the aircraft 102, and/or the like. In at least one embodiment, the aircraft 102 includes more or less sensors 114 than shown. For example, the aircraft may include weight sensors, baggage detection sensors, and/or the like.

After the aircraft 102 lands at the airport 104, the aircraft 102 taxis to a gate 116 of the airport 104. Passengers aboard the aircraft 102 disembark the aircraft 102 and pass into the airport 104 via the gate 116. The gate 116 includes a gate computer 118, which may be operated by a ramp agent, for example. The gate computer 118 is used to enter flight and passenger information, gate status, aircraft status (such as doors open or closed), and/or the like. Additionally, the gate 116 may include one or more gate cameras 120, which are used to capture and output images of the gate 116, the aircraft 102, and/or the like. Also, the airport 104 may include additional cameras that are not located at the gate 116.

The aircraft turnaround monitoring system 100 includes a turnaround analysis control unit 130 that is communicatively coupled with the flight computer 110, the cameras 112, the sensors 114, the gate computer 118, the gate camera(s) 120, and/or the like, such as through one or more wireless (or wired) connections. In at least one other embodiment, the turnaround analysis control unit 130 is communicatively coupled with less than all of the flight computer 110, the cameras 112, the sensors 114, the gate computer 118, and the gate camera(s) 120. For example, the turnaround analysis control unit 130 may not be communicatively coupled to the gate computer 118 and/or the gate camera(s) 120.

In at least one embodiment, the turnaround analysis control unit 130 is remotely located from the aircraft 102 and the gate 116. For example, the turnaround analysis control unit 130 may be at a central monitoring station, which may or may not be located at the airport 104. In at least one other embodiment, the turnaround analysis control unit 130 is onboard the aircraft 102, such as within the internal cabin 106. In at least one other embodiment, the turnaround analysis control unit 130 is at the gate 116.

The turnaround analysis control unit 130 is communicatively coupled to a display 132 (such as a television, computer monitor, touchscreen interface, handheld device such as a smart phone or tablet, and/or the like), such as through one or more wired or wireless connections. In at least one embodiment, the display 132 is collocated with the turnaround analysis control unit 130, such as at a common workstation. Optionally, the display 132 is remotely located from the turnaround analysis control unit 130. For example, the display 132 may be onboard the aircraft 102, while the turnaround analysis control unit 130 is remotely located from the aircraft 102.

The turnaround analysis control unit 130 is also communicatively coupled to a turnaround prediction control unit 134, such as through one or more wired or wireless connections. In at least one embodiment, the turnaround prediction control unit 134 is collocated with the turnaround analysis control unit 130, such as at a common workstation. The turnaround analysis control unit 130 and the turnaround prediction control unit 134 may be part of an integrated common processing system or control unit. In at least one other embodiment, the turnaround analysis control unit 130 and the turnaround prediction control unit 134 are separated and distinct processing systems or control units. In at least one embodiment, the turnaround analysis control unit 130 and the turnaround prediction control unit 134 are remotely located from one another.

The turnaround prediction control unit 134 is communicatively coupled to a turnaround database 136, such as through one or more wired or wireless connections. The turnaround prediction control unit 134 and the turnaround database 136 may be at a common location. Optionally, the turnaround database 136 may be remotely located from the turnaround prediction control unit 134. The turnaround database 136 stores historical turnaround data, such as turnaround data from past flights.

As shown, the turnaround analysis control unit 130 includes a passenger analysis module 138, a luggage analysis module 140, a catering analysis module 142, a fueling analysis module 144, a cleaning analysis module 146, a crew analysis module 148, and/or the like. The different modules may be separate portions of the turnaround analysis control unit 130. Optionally, the different modules may form a single, integrated processing system.

In operation, the turnaround analysis control unit 130 receives turnaround data from one or more of the flight computer 110, the cameras 112, the sensors 114, the gate computer 118, and/or the gate cameras 120. The turnaround analysis control unit 130 analyzes the turnaround data to determine turnaround status of the aircraft 102 between flights, such as information regarding passengers disembarking and boarding the aircraft 102, luggage removed from and boarded onto the aircraft 102, catering, fueling of the aircraft 102, cleaning of the internal cabin 106, crew status, and/or the like. In at least one embodiment, the turnaround analysis control unit 130 outputs turnaround status data (indicative of the turnaround status) to the display 132, which shows the turnaround status to an individual.

In at least one embodiment, the turnaround prediction control unit 134 receives the turnaround status data from the turnaround analysis control unit 130 and compares the turnaround status data with historical turnaround data stored in the turnaround database 136. By comparing the turnaround status data with the historical turnaround data, the turnaround prediction control unit 134 is able to predict a remaining time for various turnaround aspects. The turnaround prediction control unit 134 then outputs turnaround aspect prediction data to the display 132 (such as through one or more wired or wireless connections and/or via the turnaround analysis control unit 130) indicative of one or more turnaround aspect predictions, which are then shown on the display 132.

In at least one embodiment, the flight computer 110 receives various turnaround aspects, which may be input by a pilot or other crew member. For example, turnaround aspects related to a number of passengers onboard the aircraft 102, whether passengers from a first flight have disembarked the aircraft 102, whether passengers for a subsequent second flight have boarded the aircraft 102, whether passenger doors are open or closed, and/or the like may be input into the flight computer 110 and output to the turnaround analysis control unit 130 as turnaround data. The turnaround data is received by the turnaround analysis control unit 130, which then analyzes the received turnaround data to determine a turnaround status related to such turnaround data. For example, the turnaround analysis control unit 130 (such as via the passenger analysis module 138) may determine the turnaround status related to passengers from a first flight disembarking the aircraft 102 and passengers for a second flight boarding the aircraft 102 through the turnaround data received from the flight computer 110. In at least one embodiment, the turnaround analysis control unit 130 determines whether the passengers from the first flight have disembarked the aircraft 102 and whether the passengers for the second flight have boarded the aircraft 102 through the turnaround data received from the flight computer 110 and outputs the associated turnaround status data to the display 132, which may then show such turnaround status.

The turnaround prediction control unit 134 may compare the turnaround status data regarding the passengers and compare that with historical passenger data regarding disembarking and boarding stored within the turnaround database 136 to predict a remaining time for disembarking and/or boarding. The turnaround aspect prediction data regarding passengers disembarking and/or boarding is received by the display 132, which may then show an associated turnaround aspect prediction regarding such disembarking and/or boarding. For example, the turnaround database 136 may store historical data indicating that all passengers from a first flight should disembark within a certain time after landing and/or all passengers for a second flight should have board within a certain time after the first flight landed. The turnaround prediction control unit 134 may output an alert signal if the designated times stored in the turnaround database 136 have been surpassed without the passengers from the first flight having disembarked and/or the passengers for the second flight having boarded. The alert signal may be shown on the display 132 as a graphic and/or video message. As another example, the alert signal may be an audio signal broadcasted through a speaker.

In at least one embodiment, the cameras capture images related to various turnaround aspects, such as those related to passengers disembarking and boarding the aircraft, luggage removed from and boarded onto the aircraft, catering, fueling, crew, and/or the like. The turnaround analysis control unit 130 may analyze the received image data to determine the status of various turnaround aspects.

One or more of the cameras 112 capture images related to passengers disembarking and boarding the aircraft 102 (such as via the cabin cameras 112a), the presence of luggage carts or vehicles (such as via one or more of the cameras 112b-112e), the presence of catering vehicles at a catering door of the aircraft 102 (such as via one or more of the cameras 112a-112e), the presence of a fueling truck proximate to the aircraft 102 (such as via one or more of the cameras 112a-112e), the presence of cleaning crew and/or vehicles proximate to the aircraft 102 (such as via one or more of the cameras 112a-112e), crew disembarking and/or boarding the aircraft 102 (such as via the cabin cameras 112(a)), and/or the like. The image data from the cameras 112 is received by the turnaround analysis control unit 130 as turnaround data.

For example, the turnaround analysis control unit 130, such as via the passenger analysis module 138, detects images of passengers leaving the aircraft 102 and determines passengers disembarking and/or boarding through image analysis. The turnaround analysis control unit 130 may know a passenger count for a first flight stored in memory and count the number of disembarking passengers in relation to the passenger count to determine whether all of the passengers from a first flight have disembarked. Similarly, the turnaround analysis control unit 130 may know a passenger count for a subsequent second flight stored in memory and count the number of boarding passengers in relation to the passenger count to determine whether all of the passengers for the second flight have boarded. As another example, the passenger analysis module 138 may determine that passengers have disembarked and/or boarded by monitoring a directional flow of passengers (either out of the aircraft 102 or onto the aircraft 102) and determine that the passengers have disembarked and/or boarded after a threshold time of no additional motion out of the aircraft and/or onto the aircraft. In at least one other embodiment, passenger disembarking and/or boarding status is determined by the passenger analysis module 138 through the image data received from the cabin camera(s) 112a and data input into the flight computer 110, as described above. Also, as described above, the turnaround prediction control unit 134 may compare the turnaround status data regarding the passengers and compare that with historical passenger data regarding disembarking and boarding stored within the turnaround database 136 to predict a remaining time for disembarking and/or boarding.

As another example, the turnaround analysis control unit 130, via the passenger analysis module 138, detects passengers disembarking and boarding times through passenger doors being opened and closed via the door sensors 114b. For example, the passenger analysis module 138 monitors a sequence of doors opening and closing, via the door sensor(s) 114b, to determine whether passengers from a first flight have disembarked and passengers for a subsequent second flight have boarded.

The turnaround analysis control unit 130, such as via the crew analysis module 148, may monitor crew disembarking and/or boarding the aircraft 102 in a similar manner as with passengers. In at least one embodiment, crew information may be input into the flight computer 110 and/or the gate computer 118 and received by the turnaround analysis control unit 130 and analyzed.

In at least one other exemplary embodiment, the turnaround analysis control unit 130, such as via the luggage analysis module 140, detects images of luggage vehicles proximate to the luggage areas of the aircraft 102 and determines luggage removal and boarding through image analysis. In at least one embodiment, the turnaround analysis control unit 130 detects the presence of the luggage vehicle(s) through image analysis, such as via unique aspects of the luggage vehicle(s), distinguishing indicia thereof, and/or the like. For example, the luggage analysis module 140 may determine that luggage from a first flight has been removed from the aircraft 102 by detecting that a first set of luggage vehicles approaches and subsequently leaves the aircraft 102 over a first time frame. Similarly, the luggage analysis module 140 may determine that luggage for a second flight has been boarded onto the aircraft 102 by detecting that a second set of luggage vehicles approaches and subsequently leaves the aircraft 102 over a second time frame.

The turnaround prediction control unit 134 may compare the turnaround status data regarding the luggage and compare that with historical luggage data regarding removal and boarding stored within the turnaround database 136 to predict a remaining time for luggage removal and boarding. The turnaround prediction control unit 134 may output an alert signal if designated luggage times stored in the turnaround database 136 have been surpassed without the luggage from the first flight having been removed and/or the luggage for the second flight being boarded. The alert signal may be shown on the display 132 as a graphic and/or video message. As another example, the alert signal may be an audio signal broadcasted through a speaker.

As another example, the turnaround analysis control unit 130, such as via the catering analysis module 142, detects images of catering vehicles proximate to the aircraft 102 (such as at catering doors) and determines catering service time through image analysis. In at least one embodiment, the turnaround analysis control unit 130 detects the presence of catering vehicles through image analysis, such as via unique aspects of the catering vehicle(s), distinguishing indicia thereof, and/or the like. For example, the catering analysis module 142 may determine that catering service time is completed by detecting that the catering vehicle approaches and subsequently leaves the aircraft 102.

The turnaround prediction control unit 134 may compare the turnaround status data regarding the catering service time and compare that with historical catering service data stored within the turnaround database 136 to predict a remaining time for catering service time. The turnaround prediction control unit 134 may output an alert signal if designated catering service time stored in the turnaround database 136 has been surpassed without the current catering service being completed. The alert signal may be shown on the display 132 as a graphic and/or video message. As another example, the alert signal may be an audio signal broadcasted through a speaker.

As a further example, the turnaround analysis control unit 130, such as via the fueling analysis module 144, detects images of fueling vehicles proximate to the aircraft 102 (such proximate fueling locations) and determines fueling time through image analysis. In at least one embodiment, the turnaround analysis control unit 130 detects the presence of fueling vehicles through image analysis, such as via unique aspects of the fueling vehicle(s), distinguishing indicia thereof, and/or the like. For example, the fueling analysis module 144 may determine that fueling time is completed by detecting that the fueling vehicle approaches and subsequently leaves the aircraft 102.

As another example, the turnaround analysis control unit 130, via the fuel analysis module 144, detects fueling time through fueling data output by the fuel sensor(s) 114a of the aircraft 102. For example, the fuel analysis module 144 monitors a fuel level in relation to a final fuel amount to be supplied to the aircraft 102 through turnaround data output as fuel data by the fuel sensor(s) 114a.

The turnaround prediction control unit 134 may compare the turnaround status data regarding the fueling time and compare that with historical fueling data stored within the turnaround database 136 to predict a remaining time for fueling. The turnaround prediction control unit 134 may output an alert signal if designated fueling time stored in the turnaround database 136 has been surpassed without the current fueling being completed. The alert signal may be shown on the display 132 as a graphic and/or video message. As another example, the alert signal may be an audio signal broadcasted through a speaker.

In at least one exemplary embodiment, the turnaround analysis control unit 130, such as via the cleaning analysis module 146, detects images of cleaning carts within the aircraft 102 and determines cleaning time through image analysis. In at least one embodiment, the turnaround analysis control unit 130 detects the presence of the cleaning carts through image analysis, such as via unique aspects of the cleaning cart(s), distinguishing indicia thereof, and/or the like. For example, the cleaning analysis module 146 may determine that cleaning time is completed by detecting that the cleaning cart(s) is moved into the aircraft 102 and subsequently leaves the aircraft 102. As another example, the turnaround analysis control unit 130, via the cleaning analysis module 146, detects cleaning time through cleaning data output from the flight computer 110 (such as entered by crew) and/or the gate computer 118 (such as entered by a ramp agent).

The turnaround prediction control unit 134 may compare the turnaround status data regarding the cleaning time with historical cleaning data stored within the turnaround database 136 to predict a remaining time for cleaning. The turnaround prediction control unit 134 may output an alert signal if designated cleaning time stored in the turnaround database 136 has been surpassed without the current cleaning being completed. The alert signal may be shown on the display 132 as a graphic and/or video message. As another example, the alert signal may be an audio signal broadcasted through a speaker.

The gate camera(s) 120 or other airport cameras may also be used to capture images of passengers, luggage vehicles, catering vehicles, fueling vehicles, cleaning carts, crew, and/or the like, similar to the cameras 112 of the aircraft 102. The turnaround analysis control unit 130 may receive image data from the gate camera(s) 120 or other airport cameras to analyze the various turnaround aspects, as described above. Nevertheless, using the cameras 112, sensors 114, and/or the flight computer 110 of the aircraft 102 to output turnaround data to the turnaround analysis control unit 130 allows for aircraft-independent analysis of turnaround aspects, instead of relying on separate and distinct components data capturing devices outside of the aircraft 102.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the turnaround analysis control unit 130 and the turnaround prediction control unit 134 may be or include one or more processors that are configured to control operation thereof, as described herein.

The turnaround analysis control unit 130 and the turnaround prediction control unit 134 are configured to execute a set of instructions that are stored in one or more data storage units or elements (such as one or more memories), in order to process data. For example, the turnaround analysis control unit 130 and the turnaround prediction control unit 134 may include or be coupled to one or more memories. The data storage units may also store data or other information as desired or needed. The data storage units may be in the form of an information source or a physical memory element within a processing machine.

The set of instructions may include various commands that instruct the turnaround analysis control unit 130 and the turnaround prediction control unit 134 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the turnaround analysis control unit 130 and the turnaround prediction control unit 134. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the turnaround analysis control unit 130 and the turnaround prediction control unit 134 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
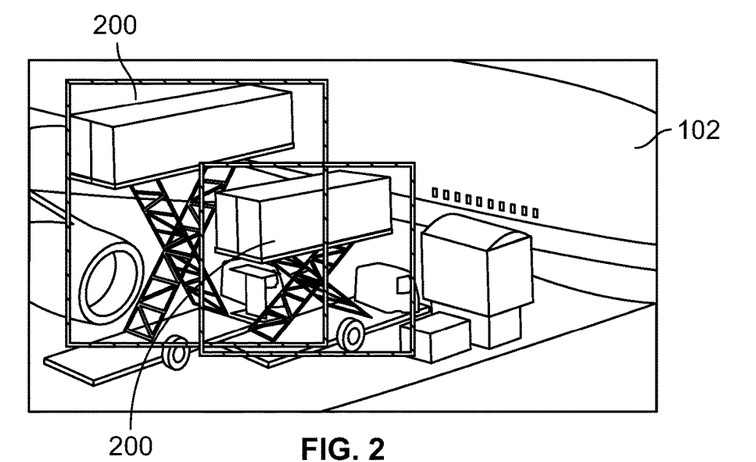
FIG. 2 is a diagrammatic representation of catering vehicles proximate to the aircraft, according to an embodiment of the present disclosure.

FIG. 2 is a diagrammatic representation of catering vehicles 200 proximate to the aircraft 102, according to an embodiment of the present disclosure. Referring to FIGS. 1 and 2, the catering vehicles 200 may be imaged by the cameras 112 of the aircraft 102 or the gate cameras 120 (as shown in FIG. 1). In at least one embodiment, the turnaround analysis control unit 130 detects the presence of the catering vehicles 200, luggage vehicles, fueling vehicles, cleaning carts, and/or the like using machine learning image recognition. For example, the turnaround analysis control unit 130 may be programmed to detect distinguishing features, shapes, indicia, and/or the like of such vehicles, carts, and/or the like.

Figure 3:
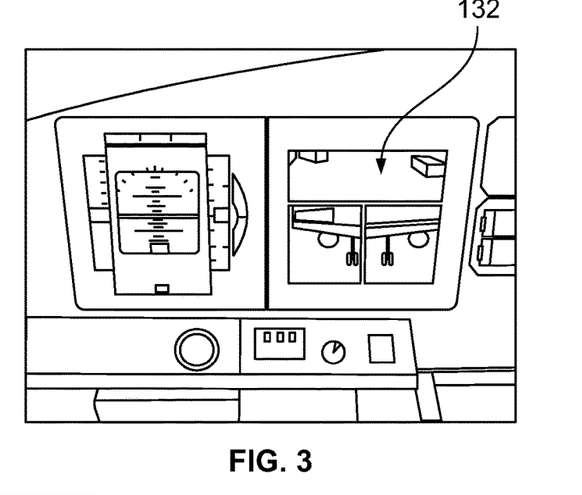
FIG. 3 is a diagrammatic representation of a display, according to an embodiment of the present disclosure.

FIG. 3 is a diagrammatic representation of the display 132, according to an embodiment of the present disclosure. Referring to FIGS. 1 and 3, in at least one embodiment, the display 132 maybe within the internal cabin 106, such as within a flight deck of the aircraft 102.

Figure 4:
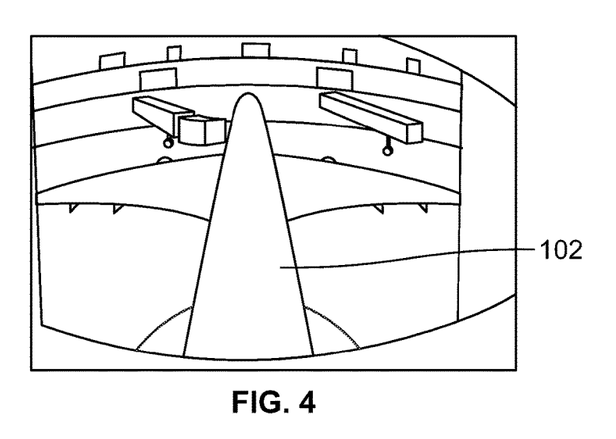
FIG. 4 is a diagrammatic representation of the aircraft as imaged by a tail camera, according to an embodiment of the present disclosure.
Figure 5:
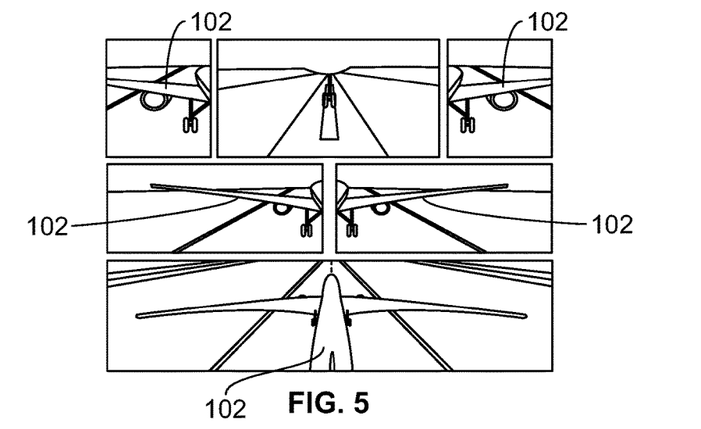
FIG. 5 is a diagrammatic representation of the aircraft as imaged by cameras of the aircraft, according to an embodiment of the present disclosure.

FIG. 4 is a diagrammatic representation of the aircraft 102 as imaged by a tail camera 112b (shown in FIG. 1), according to an embodiment of the present disclosure. FIG. 5 is a diagrammatic representation of the aircraft 102 as imaged by cameras 112 of the aircraft 102, according to an embodiment of the present disclosure. Referring to FIGS. 1, 4, and 5, the aircraft 102 includes numerous cameras 112 (shown in FIG. 1) that allow imaging of areas surrounding the aircraft 102.

Figure 6:
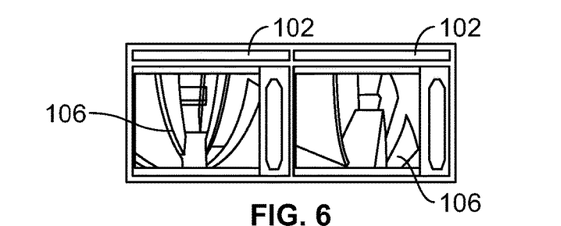
FIG. 6 is a diagrammatic representation of an internal cabin of an aircraft as imaged by cabin cameras, according to an embodiment of the present disclosure.

FIG. 6 is a diagrammatic representation of the internal cabin 106 of the aircraft 102 as imaged by cabin cameras 112a, according to an embodiment of the present disclosure. Referring to FIGS. 1 and 6, for example, the internal cabin 106 may be imaged via the cabin cameras 112a and showing a flight deck entrance and boarding door open.

Figure 7:
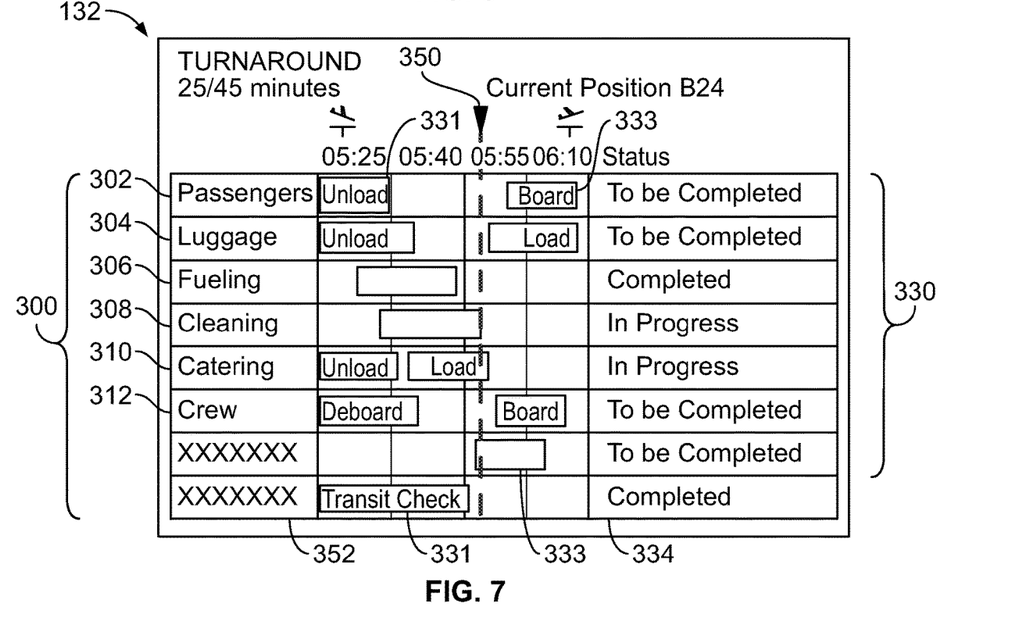
FIG. 7 is a diagrammatic representation of a display showing turnaround status aspects, according to an embodiment of the present disclosure.

FIG. 7 is a diagrammatic representation of the display 132 showing turnaround status aspects 300, according to an embodiment of the present disclosure. The turnaround status aspects 300 include passengers 302, luggage 304, fueling 306, cleaning 308, catering 310, and crew 312. Referring to FIGS. 1 and 7, the turnaround analysis control unit 130 determines a status of each of the aspects 300, as described above, and shows such status 330, including completed task bars 331 and uncompleted task bars 333, on the display 132. The turnaround analysis control unit 130 may also show a current turnaround time graphic 350 that indicates a time between landing 352 and scheduled departure 354.

Figure 8:
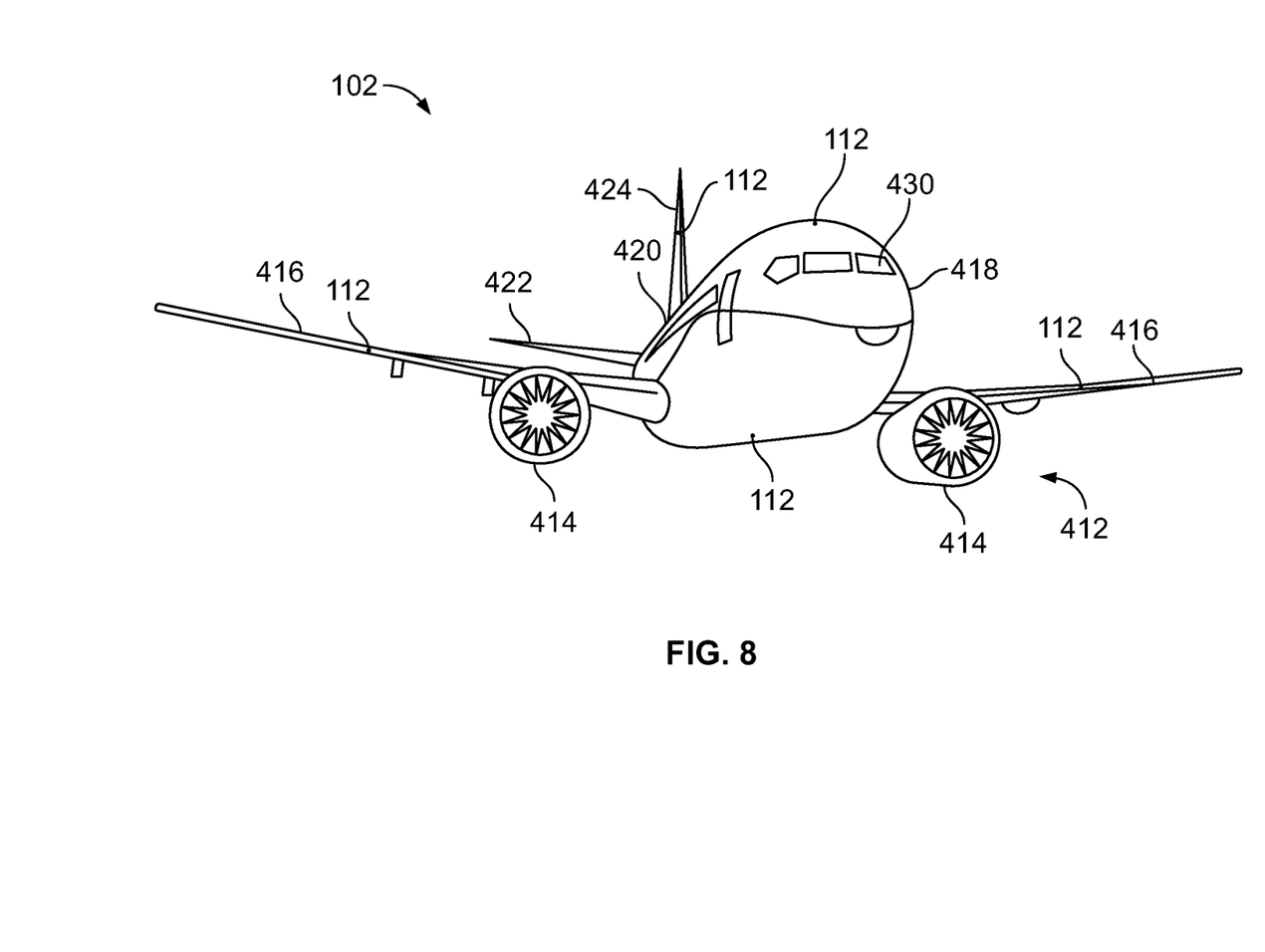
FIG. 8 is a diagrammatic representation of a front perspective view of the aircraft, according to an exemplary embodiment of the present disclosure.

FIG. 8 is a diagrammatic representation of a front perspective view of the aircraft 102, according to an exemplary embodiment of the present disclosure. The aircraft 102 includes a propulsion system 412 that may include two turbofan engines 414, for example. Optionally, the propulsion system 412 may include more engines 414 than shown. The engines 414 are carried by wings 416 of the aircraft 102. In other embodiments, the engines 414 may be carried by a fuselage 418 and/or an empennage 420. The empennage 420 may also support horizontal stabilizers 422 and a vertical stabilizer 424. The fuselage 418 of the aircraft 102 defines an internal cabin, which may include a cockpit 430.

Cameras 112 are mounted to various portions of the aircraft 102. The aircraft 102 may include more or less cameras 112 at different locations than shown.

The aircraft 102 may be sized, shaped, and configured other than shown in FIG. 8. For example, the aircraft 102 may be a non-fixed wing aircraft, such as a helicopter.

Figure 9:
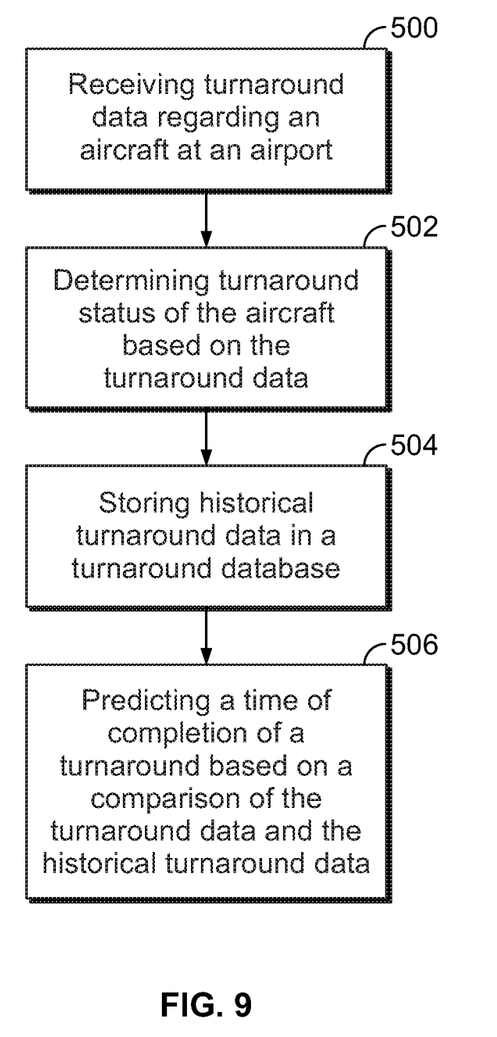
FIG. 9 illustrates a flow chart of a turnaround monitoring method that is configured to monitor a turnaround of an aircraft at an airport, according to an embodiment of the present disclosure.

FIG. 9 illustrates a flow chart of a turnaround monitoring method that is configured to monitor a turnaround of an aircraft at an airport, according to an embodiment of the present disclosure. Referring to FIGS. 1 and 9, the turnaround monitoring method includes receiving 500, by the turnaround analysis control unit 130, turnaround data regarding the aircraft 102 at the airport 104. The method also includes determining 502, by the turnaround analysis control unit 130, a turnaround status of the aircraft 102 based on the turnaround data.

In at least one embodiment, the turnaround monitoring method includes communicatively coupling the camera(s) 112 with the turnaround analysis control unit 130, communicatively coupling the sensor(s) 114 with the turnaround analysis control unit 130, and outputting the turnaround data by the camera(s) 112 and the sensor(s) 114. In at least one embodiment, the receiving 500 includes receiving the turnaround data that is output by the camera(s) 112 and the sensor(s) 114.

In at least one embodiment, the turnaround monitoring method also includes storing 504 historical turnaround data in a turnaround database 136, and predicting 506, by the turnaround prediction control unit 134, a time of completion of a current turnaround of the aircraft based on a comparison of the turnaround data and the historical turnaround data.

The turnaround monitoring method may also include communicatively coupling the gate computer 118 with the turnaround analysis control unit 130, and outputting the turnaround data from the gate computer 118. In at least one embodiment, the receiving 500 includes receiving the turnaround data output by the gate computer 118.

The turnaround monitoring method may also include communicatively coupling the flight computer 110 of the aircraft 102 with the turnaround analysis control unit 130, and outputting the turnaround data from the flight computer 110. In at least one embodiment, the receiving 500 includes receiving the turnaround data output by the flight computer 110.

Embodiments of the present disclosure provide systems and methods that allow large amounts of data to be quickly and efficiently analyzed by a computing device. Large amounts of data are being tracked and analyzed. The vast amounts of data are efficiently organized and/or analyzed by the turnaround analysis control unit 130 and the turnaround prediction control unit 134, as described herein. The turnaround analysis control unit 130 and the turnaround prediction control unit 134 analyze the data in a relatively short time in order to quickly and efficiently output turnaround analysis and predictions. A human being would be incapable of efficiently analyzing such vast amounts of data in such a short time. As such, embodiments of the present disclosure provide increased and efficient functionality with respect to prior computing systems, and vastly superior performance in relation to a human being analyzing the vast amounts of data. In short, embodiments of the present disclosure provide systems and methods that analyze thousands, if not millions, of calculations and computations that a human being is incapable of efficiently, effectively and accurately managing.

As described herein, embodiments of the present disclosure provide systems and methods for efficiently determining situational awareness of an aircraft turnaround process. Further, embodiments of the present disclosure provide systems and methods for automatically analyzing a turnaround process. Moreover, embodiments of the present disclosure provide systems and methods for gaining situational awareness of a turnaround process without requiring an individual to make a series of calls to other individuals within an airport and/or on an aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

The invention claimed is:

1. A turnaround monitoring system that is configured to monitor a turnaround of an aircraft at an airport, the turnaround monitoring system comprising:
a turnaround analysis control unit that receives turnaround data regarding the aircraft at the airport and determines a turnaround status of the aircraft based on the turnaround data
wherein the turnaround status comprises information regarding one or both of luggage removed from and boarded onto the aircraft based on detecting presence of one or more luggage vehicles proximate to one or more luggage areas of the aircraft, or crew status.

2. The turnaround monitoring system of claim 1, further comprising:
one or more cameras; and
one or more sensors,
wherein the one or more cameras and the one or more sensors output the turnaround data regarding the aircraft, and
wherein the turnaround analysis control unit is in communication with the one or more cameras and the one or more sensors, wherein the turnaround analysis control unit receives the turnaround data from the one or more cameras and the one or more sensors.

3. The turnaround monitoring system of claim 2, wherein the one or more cameras comprise at least one camera on or within the aircraft.

4. The turnaround monitoring system of claim 2, wherein the one or more cameras comprise at least one camera at the airport.

5. The turnaround monitoring system of claim 2, wherein the one or more cameras comprise one or more of:
   one or more cabin cameras that are configured to capture and output images within an internal cabin;
   one or more tail cameras mounted on a tail of the aircraft that are configured to capture and output images outside of the aircraft;
   one or more stabilizer cameras mounted on one or more stabilizers of the aircraft that are configured to capture and output images outside of the aircraft;
   one or more belly cameras mounted on a belly or underside of a fuselage of the aircraft that are configured to capture and output images outside of the aircraft; or
   one or more wing cameras mounted on one more wings of the aircraft that are configured to capture and output images outside of the aircraft.

6. The turnaround monitoring system of claim 2, wherein the one or more sensors comprise one or more fuel sensors that are configured to detect an amount of fuel within one or more fuel tanks of the aircraft.

7. The turnaround monitoring system of claim 2, wherein the one or more sensors comprise one or more door sensors that are configured to detect a position of one or more doors of the aircraft.

8. The turnaround monitoring system of claim 1, wherein the turnaround data includes information regarding passengers, luggage, catering, fueling, cleaning, and crew.

9. The turnaround monitoring system of claim 1, further comprising:
   a turnaround database that stores historical turnaround data; and
   a turnaround prediction control unit that predicts a time of completion of the turnaround based on a comparison of the turnaround data and the historical turnaround data.

10. The turnaround monitoring system of claim 1, further comprising a gate computer at a gate of the airport, wherein the turnaround analysis control unit is in communication with the gate computer, and wherein the gate computer outputs the turnaround data to the turnaround analysis control unit.

11. The turnaround monitoring system of claim 1, further comprising a flight computer of the aircraft, wherein the turnaround analysis control unit is in communication with the flight computer, and wherein the flight computer outputs the turnaround data to the turnaround analysis control unit.

12. The turnaround monitoring system of claim 1, further comprising a display in communication with the turnaround analysis control unit, wherein the turnaround analysis control unit shows the turnaround status on the display.

13. The turnaround monitoring system of claim 1, wherein the turnaround analysis control unit comprises:
   a passenger analysis module;
   a luggage analysis module;
   a catering analysis module; a fueling analysis module;
   a cleaning analysis module; and
   a crew analysis module.

14. A turnaround monitoring method that is configured to monitor a turnaround of an aircraft at an airport, the turnaround monitoring method comprising:
   receiving, by a turnaround analysis control unit, turnaround data regarding the aircraft at the airport; and
   determining, by the turnaround analysis control unit, a turnaround status of the aircraft based on the turnaround data,
   wherein the turnaround status comprises information regarding one or both of luggage removed from and boarded onto the aircraft based on determining proximity of one or more luggage vehicles to one or more luggage areas of the aircraft, or crew status.

15. The turnaround monitoring method of claim 14, further comprising:
   communicatively coupling one or more cameras with the turnaround analysis control unit;
   communicatively coupling one or more sensors with the turnaround analysis control unit; and
   outputting the turnaround data by the one or more cameras and the one or more sensors,
   wherein the receiving comprises receiving the turnaround data that is output by the one or more cameras and the one or more sensors.

16. The turnaround monitoring method of claim 14, wherein the turnaround data includes information regarding passengers, luggage, catering, fueling, cleaning, and crew.

17. The turnaround monitoring method of claim 14, further comprising:
   storing historical turnaround data in a turnaround database; and
   predicting, by a turnaround prediction control unit, a time of completion of the turnaround based on a comparison of the turnaround data and the historical turnaround data.

18. The turnaround monitoring method of claim 14, further comprising:
   communicatively coupling a gate computer with the turnaround analysis control unit; and
   outputting the turnaround data from the gate computer,
   wherein the receiving comprises receiving the turnaround data output by the gate computer.

19. The turnaround monitoring method of claim 14, further comprising:
   communicatively coupling a flight computer of the aircraft with the turnaround analysis control unit; and
   outputting the turnaround data from the flight computer,
   wherein the receiving comprises receiving the turnaround data output by the flight computer.

20. A turnaround monitoring system that is configured to monitor a turnaround of an aircraft at an airport, the turnaround monitoring system comprising:
   one or more cameras;
   one or more sensors;
   a gate computer at a gate of the airport;
   a flight computer of the aircraft, wherein the one or more cameras, the one or more sensors, the gate computer, and the flight computer output turnaround data regarding the aircraft;
   a turnaround analysis control unit in communication with the one or more cameras, the one or more sensors, the gate computer, and the flight computer, wherein the turnaround analysis control unit receives the turnaround data regarding the aircraft at the airport and determines a turnaround status of the aircraft based on the turnaround data, wherein the turnaround status includes information regarding passengers disembarking and boarding the aircraft, luggage removed from and boarded onto the aircraft, catering, fueling of the aircraft, cleaning of an internal cabin of the aircraft, and crew status;

a turnaround database that stores historical turnaround data;

a turnaround prediction control unit that predicts a time of completion of the turnaround based on a comparison of the turnaround data and the historical turnaround data; and a display in communication with the turnaround analysis control unit and the turnaround prediction control unit, wherein the turnaround analysis control unit shows the turnaround status and a predicted time of completion of the turnaround on the display.

21. The turnaround monitoring system of claim 9, wherein the historical turnaround data is data from past flights of one or both of the aircraft or at least one other aircraft.

\* \* \* \* \*